No. 794,196. PATENTED JULY 11, 1905.
H. W. SPANG.
ELECTRIC CIRCUITS FOR RAILWAY SIGNALING.
APPLICATION FILED OCT. 3, 1903.
2 SHEETS—SHEET 2.
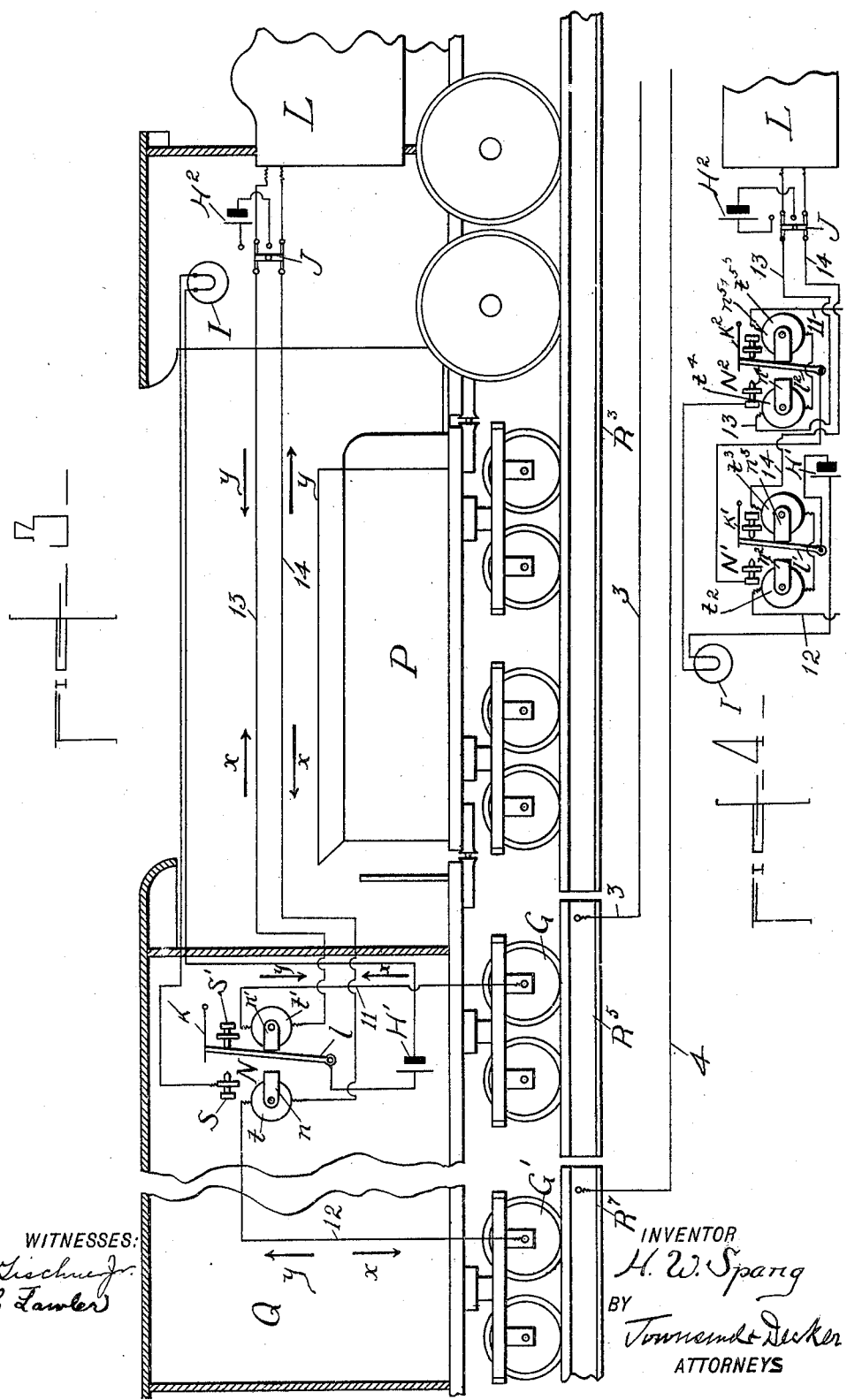
WITNESSES:
INVENTOR
H. W. Spang
BY
Townsend Decker
ATTORNEYS No. 794,196. Patented July 11, 1905.

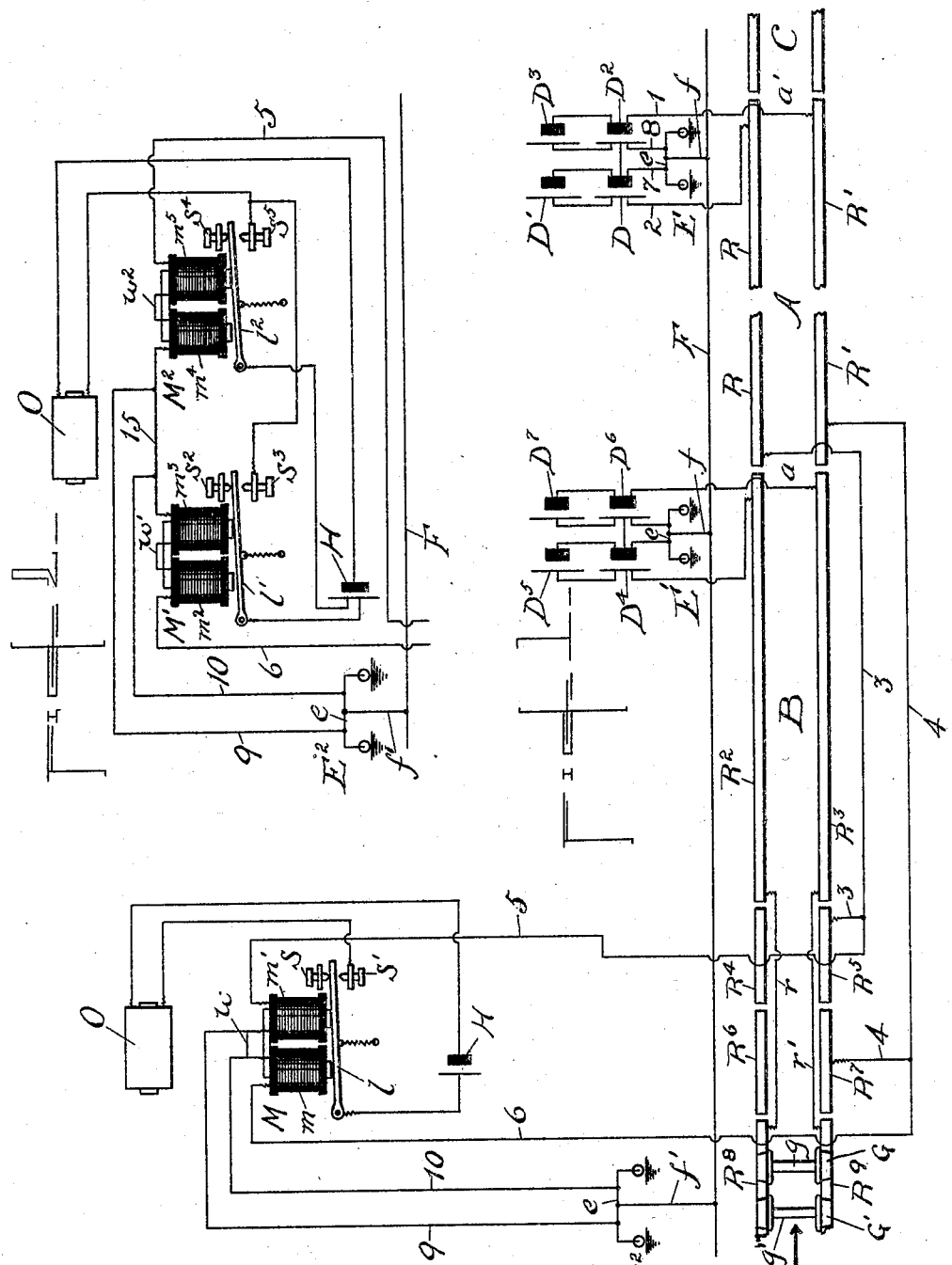

UNITED STATES PATENT OFFICE.

HENRY W. SPANG, OF NEW YORK, N. Y., ASSIGNOR, BY MESNE ASSIGNMENTS, TO CHARLES H. KETCHAM, OF YONKERS, NEW YORK.

ELECTRIC CIRCUITS FOR RAILWAY SIGNALING.

SPECIFICATION forming part of Letters Patent No. 794,196, dated July 11, 1905.

Application filed October 3, 1903. Serial No. 175,558.

*To all whom it may concern:*

Be it known that I, HENRY W. SPANG, a citizen of the United States, and a resident of New York city, in the county of New York and State of New York, have invented certain new and useful Improvements in Electric Circuits for Railway Signaling, of which the following is a specification.

My invention relates to improved electric circuits for railway signaling, and my present application constitutes a continuation as to its main features of my original application, filed September 30, 1902, Serial No. 125,372.

My invention relates particularly to that class of electric track-circuits in which a relay or electromagnet is energized and a safety-signal given to an engineer at a fixed point at a suitable distance ahead of or at the near end of a section of railway-track when the rails of such section of railway are not occupied by another locomotive or train, the said rails serving as the principal electric conductors between such magnet connected therewith at one end and a generator at the opposite end of such section.

My invention consists in the combination of a guard-circuit consisting of two lines of rails of a block-section or other suitable conductors, a controlling magnet or magnets, a sectional generator and an independent metallic circuit and two ground-circuits formed over connections with a metallic return-conductor and ground connections taken from said circuit at its opposite ends at points respectively between the sections of generator and between the coils of the controlling magnet or magnets, so that one magnet-coil or magnet is also in an independent metallic and ground circuit and the other magnet-coil or magnet is in an independent ground-circuit.

It further consists in the combination of a guard-circuit, a portion thereof being upon the rolling equipment and including a controlling magnet or magnets terminating in wheels of different trucks insulated from each other in the rolling equipment and a portion thereof being upon the permanent way, including two lines of rails of a block-section, connected at one end with a sectional generator and at the opposite end with insulated rails or short sections of rail located ahead of said block-section and an independent metallic circuit and two ground-circuits formed over connections with a metallic return-conductor and ground connections taken from said circuit at its opposite ends at points respectively between the sections of generator and between the coils of the controlling magnet or magnets upon the rolling equipment, so that one magnet-coil or magnet is also in an independent metallic and ground circuit and the other magnet-coil or magnet is in an independent ground-circuit.

It further consists in the combination with a guard-circuit on the permanent way consisting of two lines of rails of a block-section with a controlling magnet or magnets and a sectional generator at its opposite ends, a metallic return-conductor and ground connections connected with said circuit at points between the sections of generator and between the coils of said magnet or magnets, of a track-circuit closer adapted to establish a shunt or branch around said magnet-coils or magnet, and a partial circuit on the rolling equipment containing a controlling magnet or magnets terminating in wheels adapted to include the magnet or magnets on the rolling equipment in the shunt or branch and having connections between the coils of the latter-named magnet or magnets and the locomotive or other portion of the rolling equipment, so as to also provide one of said magnet-coils or magnets with an independent metallic and ground circuit and the other coil or magnet with an independent ground-circuit.

It further consists in the combination with ground-circuits formed over lines of rails of consecutive block-sections, each circuit having two lines of rails, a sectional generator connected therewith at one end, and a controlling magnet or magnets on the permanent way or upon the rolling equipment, or both, at the opposite end of connections taken from points respectively between the sections of generator and between the magnet-coils or magnets with ground connections and a metallic conductor extending along the railway, so as to also form two ground-circuits, one for each magnet-coil or magnet of each circuit, and an independent metallic circuit for one of the magnet-coils or magnets.

It further consists in a polarized relay or relays upon the rolling equipment which control a signal-circuit thereon and terminate in the wheels of the rolling equipment, insulated from each other and forming part of a guard-circuit and in which the armature lever or levers are moved in one direction when said magnet or magnets are energized by the current of generator in the portion of guard-circuit along the permanent way which flows over said magnet or magnets in one direction, and said lever or levers are moved in the opposite direction by current of generator upon the rolling equipment flowing over said magnet or magnets in an opposite direction.

It further consists in the novel arrangements and combinations of devices and connecting-conductors, as herein shown and described, and specifically set forth in the claims.

In the accompanying drawings, Figure 1 is a diagram illustrating one form of my invention as applied to one track of a double-track system in which the trains always move in one direction, as indicated by the arrow, the second or return track not being illustrated herein. Fig. 2 is a modification thereof. Fig. 3 is a side elevation of a locomotive and adjacent car, illustrating the portion of electric circuit thereon; and Fig. 4 illustrates two controlling-magnets therefor.

Similar reference characters are used to designate like parts in all the views.

A is a section of track which may be a mile long, more or less, and having its rails insulated or separated from metallic contact with the rails of the adjacent sections B and C, as shown at $a$ and $a'$.

Rails R R' constitute section of track A, and rails $R^2$ $R^3$ $R^4$ $R^5$ $R^6$ $R^7$ $R^8$ $R^9$ constitute the adjacent section B. Each line of rails R R' of section A and $R^2$ $R^3$ $R^8$ $R^9$ of section B should have metallic continuity throughout its length by means of suitable metallic bonds or connectors at the rail-joints thereof. Rails $R^2$ $R^3$ $R^8$ $R^9$ of section B are connected together by metallic connectors $r$ and $r'$. Rails $R^4$ $R^5$ $R^6$ $R^7$ are insulated or separated from each other, and their insulations or separations are preferably directly opposite each other. Each of said rails can be a single rail or two or more bonded rails, according to the distance employed between wheels G and G' of the rolling equipment moving on said rails. Wheels G are insulated from G' in any suitable way. Preferably they are wheels belonging to different trucks of a tender or car or train of cars and are thus insulated from one another. Short sections $R^4$ $R^5$ $R^6$ $R^7$ consist of one or more insulated rails, and centers of rails $R^4$ $R^5$ are at such distance from centers of rails $R^6$ $R^7$ so that when wheels G engage the rails $R^4$ $R^5$ wheels G' will engage $R^6$ $R^7$. When said rails are bridged by said wheels, they constitute a railway-track-circuit closer for momentarily completing or closing a circuit or circuits over the controlling magnet or magnets on the rolling equipment. (Shown in Figs. 3 and 4.) Such insulated rails are preferably selected at a suitable point ahead of the near end $a$ of section of track A, so that when wheels G G' of locomotive and tender or of a car or cars moving in direction of arrow contact, respectively, with said rails and section of track A is clear a safety-signal will be given upon a locomotive at a safe distance ahead of the near end thereof.

D D' $D^2$ $D^3$ are gravity batteries or cells or other generators connected in series multiple or in any other suitable manner with the track-circuit and arranged in two sections, so that connections can be made between them, and thereby constituting a sectional generator.

M, Fig. 1, and M' $M^2$, Fig. 2, are relay-magnets of suitable type located along the permanent way and consisting of coils $m$ $m'$, $m^2$ $m^3$, and $m^4$ $m^5$, connected by wires $w$, $w'$, and $w^2$, and armature-levers $l$, $l'$, and $l^2$, which move in one direction and contact, respectively, with stops S, $S^2$, and $S^4$ when said coils are energized and in opposite direction by gravity or springs, or both, and contact with stops S', $S^3$, and $S^5$ when said coils are deënergized.

E, E', and $E^2$ are grounded connections or systems, each consisting, preferably, of a suitable number of iron pipes driven well into permanent moisture or otherwise well embedded in well-saturated earth and connected together by conductor or conductors $e$. They should afford much better electrical continuity with the earth than that afforded by either of the lines of rails of section A or B in connection with the wooden ties, ballast, and adjacent surface earth, and especially during the moist condition thereof.

F is a wire or other suitable conductor of good conductivity extending along a track-circuit or any desired number of consecutive block-sections and is connected by branch conductors $f$ $f'$ and wires $e$ with the sections of generators, and also by wire 9 or 10 with connecting-wire $w$ or 15 between two coils or magnets of such track-circuit, and also with ground connections, as shown in Figs. 1 and 2.

When conductor F is solely employed as an additional return-conductor, it can be insulated from the earth. It can also be utilized by the consecutive circuits of the second or return track of a double-track system, either as grounded return metallic conductor or solely as a return metallic conductor. During a thunderstorm the induced electricity of the track-circuits of all or any number of consecutive block-sections will be able to discharge principally through the batteries at ends $a'$ to conductor F and thence to the earth via the multiplicity of ground connections simultaneously with lightning discharges taking place in line with railway or adjacent points, and thereby protect the controlling-relays from damage by such induced charges. The said grounded conductor can also be utilized in connection with lightning-arresters required for such track or guard circuits and other electrical circuits employed along the railway for the movement of trains or other purposes.

Magnet M, Fig. 1, and magnet M' M², Fig. 2, are located at a suitable point between end $a$ of section A and rails R⁴ R⁵ R⁶ R⁷ of section B and is or are in a closed circuit when section of track A is clear, with the signal controlled by magnet O at "safety" in an open signal-circuit. The coils $m$ $m'$ of magnet M, Fig. 1, will then not only be in a complete metallic circuit embracing all battery-cells D D' D² D³ and both lines of rails R R' of section A, but also in independent ground-circuits, coil $m$ then embracing line of rails R', battery-cells D² D³, and ground connections E E² in a ground-circuit, and coil $m'$ then embracing line of rails R, battery-cells D D', and ground connections E E² in a ground-circuit. Either the coil $m$ will also be in an independent metallic circuit embracing battery-cells D² D³, wire 8, wire F, wires 10 6 4, line of rails R', wire 1, and wires $f$ $f'$, or coil $m'$ will also be in an independent metallic circuit embracing wires 7 and 2, line of rails R, wires 3, 5, and 9, and wires $f$, $f'$, and F. Both magnets M' M² will then not only be in a complete matallic circuit embracing all battery-cells D D' D² D³ and both lines of rails R R' of section A, but also in independent ground-circuits, magnet M' then embracing line of rails R', battery-cells D² D³, and ground connections E E² in a ground-circuit, and magnet M² embracing line of rails R, battery-cells D D', and ground connections E E² in a ground-circuit. Either magnet M' will also be in an independent metallic circuit embracing battery-cells D², D³, wire 8, wire F, wires 10 6 4, lines of rails R', wire 1, and wires $f$ $f'$, or magnet M² will also be in an independent metallic circuit embracing wires 7 and 2, line of rails R, wires 3, 5, and 9, and wires $f$, $f'$, and F. When rails R R' of section A are occupied by wheels and axles of a locomotive or train, the current of batteries D D' D² D³ are shunted from magnet M, Fig. 1, and from magnets M' M², Fig. 2, which are then deënergized, thereby causing lever $l$ or levers $l'$ and $l^2$ to contact with stop S' or stops S³ and S⁵ and close circuit of battery H over signal-magnet O and cause a danger-signal to be given. It will be observed that coil $m$ or $m'$ of magnet M, Fig. 1, or magnet M' or M², Fig. 2, can have the benefit of not only ground connections E E², but of ground connections E'. It is evident that with such circuits the resistance and retardation offered to the battery-current will be greatly reduced and the current-flow between the rails and the earth reduced to a minimum, and thereby enable the rails to be used for longer signal-circuits and better working circuits provided than is possible with the ordinary track-circuit. They will also absolutely cause a danger-signal to be given when a rail in a sectional line of rails is removed or broken.

N, Fig. 3, is a polarized relay upon a car or locomotive, and consists of magnet-coils $t$ $t'$, connected by wires 13 and 14, circuit-closer J, and metal-work of locomotive, and to iron cores of said magnet-coils iron plates or poles $n$ $n'$ are attached.

The lever $l$ is supported and polarized by a permanent magnet, and when the polarity of pole-pieces $n$ $n'$ is changed by opposite or reverse currents flowing over magnet-coils $t$ $t'$ it alternately contacts with stops S and S' and closes or breaks circuit of signal-battery H' over lamp I. The coils $t$ $t'$ are connected by wires 11 and 12 with wheels G G' of front and rear trucks of car Q or tender P. The object of connecting coils $t$ and $t'$ with metal portion of locomotive L or other portion of the rolling equipment by wires 13 and 14 and circuit-closer J is to form connection over the locomotive with rails R² R³, batteries D⁴ D⁵ D⁶ D⁷, wire F, and ground connections E', the current of said batteries being at the same time shunted from magnet N on the rolling equipment and relay M on the permanent way by the wheels and axles of locomotive in connection with rails R² R³ or R⁸ R⁹.

When section of track A is clear, relay M on permanent way is energized by batteries D D' D² D³, and when wheels G G' bridge rails R⁵ R⁷ the coils $t$ $t'$ of magnet N on the rolling equipment will be energized by the current of said batteries flowing in one direction, as shown by arrows $x$, momentarily between rails R⁵ R⁷ and locomotive L over wheels G G' and wires 11, 12, 13, and 14 in an ordinary metallic circuit, and each coil $t$ and $t'$ is also in an independent ground-circuit and coil $t$ then embracing wires 12 14, locomotive L, rails R², battery-cells D⁴ D⁵ of section of track B, ground connections E', wheels G', rails R⁷, wire 4, rails R', battery-cells D² D³, and ground connections E, and coil $t'$ then embracing wires 11 13, locomotive L, rails R³, battery-cells D⁶ D⁷ of section of track B, ground connections E', wheels G, rail R⁵, wire 3, rails R, battery-cells D D', and ground connections E. Either coil $t$ is in an independent metallic circuit embracing locomotive L, rails R², batteries D⁴ D⁵ of section B, wheels G', rail R⁷, rails R', batteries D² D³, wires $f$ $f'$ and F, or coil $t'$ is in an independent metallic circuit embracing locomotive L, rails R³, battery-cells D⁶ D⁷ of section B, wheels G, rail R⁵, rails R, battery-cells D D', wires $f$ $f'$ and F, thereby causing lever $l$ to contact with stop S and closing circuit of battery H' over incandescent lamp I and give a safety-signal on the locomotive until coils $tt'$ are energized by current of battery $H^2$, flowing in an opposite direction, as shown by arrows $y$, over said coils, wheels G G', and rails $R^3$, which can be accomplished by circuit-closer J, operated by the engineer, or such circuit can be automatically closed by means of the heat of the signal-lamp I operating on a thermostat or any other suitable means. The pressure-spring K, which rests upon the lever $l$, prevents it being moved by the jar of the locomotive from the position it is last placed and while said coils are deënergized.

Should a safety-signal be seen upon locomotive before it reaches rails $R^4 R^5 R^6 R^7$, the engineer will know that lever $l$ of magnet N on locomotive has stuck to stop S or that the signal mechanism is out or order. It is therefore obvious that under this system an engineer cannot be misled by an improper signal given by a defective relay-magnet or defective signal mechanism.

In Fig. 4 the signal-circuit embracing lamp I and battery H' on locomotive is controlled by the levers $l'$ $l^2$ of two polarized relay-magnets N' $N^2$, which are moved in one direction when energized by a sectional battery along the permanent way and in the opposite direction by the closing of current of battery $H^2$ through said magnets and flowing in an opposite direction by circuit-closer J or other means. When the relay-magnets N' $N^2$, Fig. 4, are energized by batteries D D' $D^2$ $D^3$ of Fig. 1, they are embraced in the same guard-circuit and independent ground-circuits as coils $t$ $t'$ of magnet N, Fig. 3, and either magnet N' or $N^2$ will be in an independent metallic circuit with wire F, as either coil $t$ or $t'$ of magnet N.

I do not confine myself to the operation of controlling magnet or magnets on the locomotive or other portion of the rolling equipment in multiple with controlling magnet or magnets on the permanent way, as it or they can be operated independently thereof in connection with the portion of guard-circuit on permanent way, consisting of insulated rails $R^5$ $R^7$ and rails $R^2$ $R^3$ of section B, rails R R' of section A, sectional generator D D' $D^2$ $D^3$, and the conductor F and ground connections, as shown and described.

I do not confine myself to the employment of conductor F with or without the ground connections to the guard-circuits herein shown and described, as it is applicable to any other suitable guard circuit or circuits.

I do not confine myself to the employment of ordinary relays having neutral armatures for the control of signal-circuits along the permanent way, as polarized relays can be substituted and employed with such circuits, and especially where two relays are required.

I do not confine myself to the operation of each guard or track circuit by an independent sectional generator as herein shown and described, as a number of such circuits can be charged by a suitable single sectional generator.

I do not confine myself to rails $R^4 R^5 R^6 R^7$, bridged by wheels G G', as circuit-closer for controlling magnet or magnets on the rolling equipment in connection with sectional generator, conductor F, and the ground connections on the permanent way, as two opposite insulated rails in connection with wheels G G' or any other suitable circuit-closer can be employed therewith.

It is obvious that each relay M' and $M^2$, Fig. 2, and each relay N' and $N^2$, Fig. 4, can control an independent signal-circuit and signal instead of controlling the same signal-circuit and signal, as shown in said figures. Wires 3 and 4, Fig. 1, can also be respectively connected with rails $R^4$ $R^6$.

I employ the term "guard-circuit" to indicate a primary or main circuit which embraces a relay or relays or electromagnet or magnets energized by the current of generator included in a track or any other circuit of a block-section which is under the control of a train or when included in a primary circuit having a circuit-controller operated by a railway-switch, drawbridge, or signalman, such relay or relays controlling a secondary or signal circuit or magnet or magnets, directly controlling a signal along the permanent way, or a signal or other device upon the rolling equipment.

What I claim as new, and desire to secure by Letters Patent, is—

1. The combination of a track-circuit formed of two lines of rails of a section of track having a suitable source of electricity connected to one end of said rails, and a controlling-magnet with two coils connected to the other end of said rails, of a conductor extending along said circuit and connected with ground connections and the said track-circuit at its opposite ends so as to afford an additional metallic and ground circuit including a magnet-coil, a line of rails, the said conductor and ground connections, and an additional ground-circuit embracing the other magnet-coil, a line of rails and ground connections, as and for the purpose set forth.

2. The combination of a track-circuit formed of two lines of rails of a section of track having a suitable source of electricity connected to one end of said rails, and controlling magnet-coils connected to the other end of said rails, of a conductor extending along said circuit and connected with ground connections and the said track-circuit at its opposite ends so as to afford an additional metallic and ground circuit including coils of a magnet, a line of rails, the said conductor and ground connections and also an additional ground-circuit, including coils of the other magnet, a line of rails and ground connections, as and for the purpose set forth.

3. The combination with a guard-circuit having a portion thereof upon the rolling equipment and including two controlling magnet-coils terminating in wheels of different trucks, insulated from each other in the rolling equipment and a portion thereof upon the permanent way, including two lines of rails of a track-section, connected at one end with a sectional generator and at opposite end with insulated rails located ahead of said track-section, of an independent metallic circuit and two ground-circuits formed over connections with a metallic return-conductor and ground connections at its opposite ends taken at points respectively between the sections of generator and between the magnet-coils upon the rolling equipment.

4. The combination with a guard-circuit having a portion thereof upon the rolling equipment and including controlling magnet-coils terminating in wheels of different trucks, insulated from each other in the rolling equipment and a portion thereof upon the permanent way, including two lines of rails of a track-section, connected at one end with a sectional generator and at opposite end with insulated rails located ahead of said track-section, of an independent metallic circuit and two ground-circuits formed over connections with a metallic return-conductor and ground connections at its opposite ends at points respectively between the sections of generator and between the magnet-coils upon the rolling equipment.

5. In an electric railway signal system, the combination with a guard-circuit having a portion thereof upon the rolling equipment consisting of two controlling magnets-coils, terminating in wheels of different trucks insulated from each other in the rolling equipment, and the other portion of said circuit being upon the permanent way and consisting of two lines of rails of a section of track having a sectional generator connected at one end thereof and insulated rails or sections of rail at the opposite end and adapted to complete said circuit when bridged by said insulated wheels, of a conductor extending along said circuit and connected with ground connections and having connections taken at points between the sections of generator and between said magnet-coils, so as to afford an additional metallic and ground circuit including a magnet-coil, a line of rails, the said conductor and ground connections and an additional ground-circuit including the other magnet-coil, line of rails and ground connections, as and for the purpose set forth.

6. In an electric railway signal system the combination with a guard-circuit having a portion thereof upon the rolling equipment consisting of controlling magnet-coils, terminating in wheels of different trucks insulated from each other in the rolling equipment, and the other portion of said circuit being upon the permanent way and consisting of the two lines of rails of a section of track having a sectional generator connected at one end thereof and insulated rails or sections of rail at the opposite end and adapted to complete said circuit when bridged by said insulated wheels, of a conductor extending along said circuit and connected with ground connections and having connections taken at points between the sections of generator and between the said magnet-coils, so as to afford an additional metallic and ground circuit including coils of a magnet, a line of rails, the said conductor and ground connections and an additional ground-circuit including coils of the other magnet, a line of rails and ground connections, as and for the purpose set forth.

7. The combination with a guard-circuit having a sectional generator and two controlling magnet-coils at opposite ends thereof, of a conductor extending along said circuit and ground connections, so as to afford an additional metallic and ground circuit including a magnet-coil, one leg of guard-circuit and the said conductor and ground connections and an additional ground-circuit including the other magnet-coil, leg of guard-circuit and ground connections.

8. The combination with a guard-circuit having a sectional generator and controlling magnet-coils at opposite ends thereof, of a conductor extending along said circuit and ground connections, so as to afford an additional metallic and ground circuit including coils of a magnet, one leg of guard-circuit and the said conductor and ground connections and an additional ground-circuit including coils of the other magnet, leg of guard-circuit and ground connections.

9. The combination with a guard-circuit, formed of two lines of rails of a block-section having a sectional generator and two controlling magnet-coils at opposite ends thereof, of a conductor extending along the said circuit and ground connections so as to afford an additional metallic and ground circuit including a magnet-coil, a line of rails, the said conductor and ground connections, and an additional ground-circuit, including the other magnet-coil, a line of rails and ground connections.

10. The combination with a guard-circuit formed of two lines of rails of a block-section having a sectional generator and controlling magnet-coils at opposite ends thereof, of a conductor extending along the said circuit and ground connections so as to afford an additional metallic and ground circuit including coils of one magnet, a line of rails, the said conductor and ground connections, and an additional ground-circuit, including coils of the other magnet, a line of rails and ground connections.

11. The combination with a guard-circuit having a sectional generator and two controlling magnet-coils at opposite ends thereof, of a conductor extending along the said circuit so as to afford an additional metallic circuit including a magnet-coil, one leg of the guard-circuit and the said conductor.

12. The combination with a guard-circuit having a sectional generator and controlling magnet-coils at opposite ends thereof, of a conductor extending along the said circuit so as to afford an additional metallic circuit including coils of a magnet, one leg of the guard-circuit and the said conductor.

13. The combination with a guard-circuit, formed of two lines of rails of a block-section having a sectional generator and two controlling magnet-coils at opposite ends thereof, of a conductor extending along the said circuit so as to afford an additional metallic circuit including a magnet-coil, a line of rails and the said conductor.

14. The combination with a guard-circuit, formed of two lines of rails, of a block-section having a sectional generator and controlling magnet-coils at opposite ends thereof, of a conductor extending along the said circuit, so as to afford an additional metallic circuit, including coils of a magnet, a line of rails and the said conductor.

15. The combination with a controlling device on the rolling equipment of actuating-coils therefor, and terminating in wheels of the rolling equipment which are insulated from one another, a generator along the permanent way connected with insulated rails or sections of rail, which when bridged by said wheels complete a guard-circuit for actuating the controlling device in one direction by means of current flowing over said coils in one direction, of a generator and circuit-closer upon the rolling equipment for actuating the said device in an opposite direction by means of current flowing over said coils in an opposite direction.

16. The combination with a controlling device on the rolling equipment of actuating-coils therefor, and terminating in the wheels of the rolling equipment, insulated from one another, a block-section of railway-track having its opposite rails connected at one end to a generator and at the opposite end to insulated rails or sections of rail, which when bridged by the said wheels will complete a guard-circuit for actuating the controlling device in one direction by means of current flowing over said coils in one direction, of a generator and circuit-closer upon the rolling equipment for actuating said device in an opposite direction by means of current flowing over said coils in an opposite direction.

17. The combination with a controlling device on the rolling equipment, of two actuating-coils therefor, and terminating in wheels of the rolling equipment, insulated from one another, a block-section of railway-track having its opposite rails connected at one end to a sectional generator and the opposite end to insulated rails or sections of rail, independent connections between the said actuating-coils and the locomotive or other portion of the rolling equipment so as to form connection with ground connections, via batteries and rails of the section of track, with which the locomotive contacts, ground connections taken from between the sections of said generator, a conductor extending along the railway and connected with points between the said ground connections and sectional generators of each block-section, so that when said insulated rails are bridged by said insulated wheels the said actuating-coils will be energized by an ordinary guard-circuit and one coil will also be in an additional metallic and ground circuit embracing one leg of the guard-circuit and the said grounded conductor and the other coil will also be in a ground-circuit embracing one leg of the guard-circuit and ground connections, and thereby actuating said controlling device in one direction, by means of current flowing over said coils in one direction, of a generator and circuit-closer upon the rolling equipment for actuating the said device in an opposite direction by means of current flowing over said coils in an opposite direction.

18. The combination with two controlling devices on the rolling equipment, of actuating-coils therefor and terminating in wheels of the rolling equipment, insulated from one another, a block-section of railway-track having its opposite rails connected at one end to a sectional generator and at the opposite end to insulated rails or sections of rail, independent connections between the said magnets and the locomotive or other portion of the rolling equipment so as to form connection with ground connections, via batteries and rails of the section of track with which the locomotive contacts, ground connections taken from between the sections of said generator, a conductor extending along the railway and connected with points between the said ground connections and sectional generators of each block-section, so that when said insulated rails are bridged by said insulated wheels the said coils will be energized by an ordinary guard-circuit and coils of one magnet will also be in an additional metallic and ground circuit embracing one leg of the guard-circuit and the said grounded conductor and the coils of other magnet will also be in a ground-circuit embracing one leg of the guard-circuit and ground connections, and thereby actuating said controlling devices in one direction by means of current flowing over said coils in one direction, of a generator and a circuit-closer on the rolling equipment for actuating the said devices in an opposite direction by means of current flowing over all said coils in an opposite direction.

19. The combination with guard-circuits formed over sectional lines of rails of consecutive block-sections, each circuit having two lines of rails, a sectional generator connected therewith at one end and two controlling magnet-coils on the permanent way at the opposite end, of connections taken from points respectively between the sections of generator and between coils of the controlling-magnet with ground connections and a conductor extending along the railway, so as to form an additional metallic circuit for one magnet-coil and a ground-circuit for each magnet-coil.

20. The combination with guard-circuits formed over sectional lines of rails of consecutive block-sections, each circuit having two lines of rails, a sectional generator connected therewith at one end and controlling magnet-coils on the permanent way at the opposite end, of connections taken from points respectively between the sections of generator and between said coils with ground connections and a conductor extending along the railway, so as to form an additional metallic circuit for coils of one magnet and a ground-circuit for coils of each magnet.

21. The combination with guard-circuits formed over sectional lines of rails of consecutive block-sections, each circuit having two lines of rails, a sectional generator connected therewith at one end and insulated rails or sections of rail in the preceding block-section at the opposite end, controlling magnet-coils on the rolling equipment and terminating in wheels G, G', of different trucks insulated from one another in the rolling equipment, independent connections taken between said magnet-coils with the locomotive or other portion of the rolling equipment so as to form connection with ground connections via batteries and rails of the section of track with which the locomotive contacts, ground connections taken from between the sections of said generator, and a conductor extending along the railway and connections taken from points between the said ground connections and sections of generators of the different block-sections with said conductor, so that when said insulated rails are bridged by said insulated wheels, a guard-circuit will be completed over both magnet-coils and an additional metallic circuit will be formed over a magnet-coil and a ground-circuit over each magnet-coil.

22. The combination with guard-circuits formed over sectional lines of rails of consecutive block-sections, each circuit having two lines of rails, a sectional generator connected therewith at one end and insulated rails or sections of rail at the opposite end, controlling magnet-coils on the rolling equipment and terminating in wheels G, G', of different trucks insulated from one another in the rolling equipment, independent connections taken between said magnet-coils with the locomotive or other portion of the rolling equipment so as to form connection with ground connections via batteries and rails of the section of track with which the locomotive contacts, ground connections taken from between the sections of said generator, of a conductor extending along the railway and connections taken from points between the said ground connections and sections of generators of the different block-sections with said conductor, so that when said insulated rails are bridged by said insulated wheels, a guard-circuit will be completed over all magnet-coils and an additional metallic circuit will be formed over coils of a magnet and a ground-circuit over coils of each magnet.

23. The combination with guard-circuits formed over sectional lines of rails of consecutive block-sections, each circuit having two lines of rails, a sectional generator connected therewith at one end and two controlling magnet-coils on the permanent way at the opposite end, of connections taken from points respectively between the sections of generator and between said coils with a conductor extending along the railway, so as to form an additional metallic circuit for a magnet-coil.

24. The combination with guard-circuits formed over sectional lines of rails of consecutive block-sections, each circuit having two lines of rails, a sectional generator connected at one end and controlling magnet-coils on the permanent way at the opposite end, of connections taken from points respectively between the sections of generator and between said coils with a conductor extending along the railway, so as to form an additional metallic circuit for coils of a magnet.

25. The combination with guard-circuits formed over sectional lines of rails of consecutive block-sections, each circuit having two lines of rails, a sectional generator connected therewith at one end and insulated rails or sections of rail at the opposite end, two controlling magnet-coils on the rolling equipment and terminating in wheels of different trucks insulated from one another in the rolling equipment, independent connections taken between said magnet-coils with the locomotive or other portion of the rolling equipment, so as to form connection via batteries and rails of the section of track with which the locomotive contacts, a conductor extending along the railway and connections taken from points between the sections of generators of the different block-sections with said conductor so that when said insulated rails are bridged by said insulated wheels, a guard-circuit will be completed over both magnet-coils, and an additional metallic circuit formed over one of said magnet-coils.

26. The combination with guard-circuits formed over sectional lines of rails of consecutive block-sections, each circuit having two lines of rails, a sectional generator connected therewith at one end and insulated rails or sections of rail at the opposite end, controlling magnet-coils on the rolling equipment and terminating in wheels of different trucks insulated from one another, in the rolling equipment, independent connections taken between said magnets with the locomotive or other portion of the rolling equipment, so as to form connection via batteries and rails of the section of track with which the locomotive contacts, a conductor extending along the railway and connections taken from points between the sections of generators of the different block-sections with said conductor so that when said insulated rails are bridged by said insulated wheels, a guard-circuit will be completed over all the said coils, and an additional metallic circuit formed over coils of a magnet.

27. The combination with a railway-signal guard-circuit on the permanent way, consisting of two controlling magnet-coils, two lines of rails of a block-section, a sectional generator, a grounded conductor connected with said circuit at points between the sections of generator and between said magnet-coils, of a track-circuit closer adapted to establish a shunt or branch around said magnet-coils and a partial circuit on the rolling equipment, containing two controlling magnet-coils terminating in wheels adapted to include the latter-named coils in the shunt or branch, and having connections between the said coils and the locomotive or other portion of the rolling equipment and said grounded conductor, substantially as shown and described.

28. The combination with a railway-signal guard-circuit on the permanent way, consisting of controlling magnet-coils, two lines of rails of a block-section, a sectional generator, a grounded conductor connected with said circuit at points between the sections of generator and between said magnet-coils, of a track-circuit closer adapted to establish a shunt or branch around said magnet-coils, and a partial circuit on the rolling equipment, containing controlling magnet-coils terminating in wheels adapted to include the latter-named coils in the shunt or branch, and having connections between the said coils and the locomotive or other portion of the rolling equipment and said grounded conductor, substantially as shown and described.

29. The combination of a partial circuit on the rolling equipment containing two controlling magnet-coils, and terminating in wheels G, G', of different trucks of the rolling equipment, independent connections between said coils and the locomotive, L, with a guard-circuit along the permanent way consisting of rails R, R', of section A, connected at one end with a sectional generator and at the other end with insulated rails $R^5$, $R^7$, of section B, and two signal-controlling magnet-coils on the permanent way and grounded conductor F, connected with sectional batteries of sections A and B and with points between the magnet-coils on the permanent way, so that when locomotive L bridges rails $R^2$, $R^3$, of section B, and insulated wheels G, G', and axles $g$, $g'$, bridge insulated rails $R^5$, $R^7$, both controlling-coils upon the rolling equipment will be energized in a guard or metallic circuit and each of the latter-named coils in a ground-circuit and one coil in an additional metallic circuit as set forth.

30. The combination of a partial guard-circuit on the rolling equipment containing controlling magnet-coils, and terminating in wheels G, G', of different trucks of the rolling equipment, independent connections between said magnets and the locomotive L, with a guard-circuit along the permanent way consisting of rails R, R', of section A, connected at one end with sectional generator and at the other end with insulated rails $R^5$, $R^7$, of section B, and signal-controlling magnet-coils on the permanent way and grounded conductor F, connected with sectional generators of sections A and B, and with points between said coils on the permanent way, so that when locomotive L bridges rails $R^2$, $R^3$, of section B, and insulated wheels G, G', bridge insulated rails $R^5$, $R^7$, all the controlling magnet-coils upon the rolling equipment will be energized in a guard or metallic circuit, and the coils of each magnet in a ground-circuit and the coils of one magnet in an independent metallic circuit as set forth.

31. The combination with the sectional generators respectively connected with the sectional lines of rails of consecutive block-sections, of connections taken at points between the sections of generators with a grounded conductor extending along a railway as and for the purpose set forth.

32. The combination with the sectional generators respectively connected with the sectional lines of rails of consecutive block-sections of connections taken at points between the sections of generators with a metallic return-conductor extending along a railway substantially as and for the purpose set forth.

33. In an electric railway signal system, a constant electric circuit consisting of lines of rails R, R', of section of track, A, having a sectional generator connected therewith at one end and two controlling magnet-coils at opposite end and connections taken at points between the sections of generator and between the magnet-coils, with conductor F extending along said circuit and with ground connections substantially as shown and described.

34. In an electric railway signal system, a constant electric circuit consisting of lines of rails R, R', of section of track A, having a sectional generator connected therewith at one end and controlling magnet-coils at opposite end and connections taken at points between the sections of generator and between the said coils with conductor F extending along said circuit and with ground connections, substantially as shown and described.

35. The combination with a constant electric circuit consisting of lines of rails, R, R', of section of track A, having a sectional generator at one end and controlling magnet-coils upon the permanent way at opposite end, and connections taken at points between the magnet-coils and sections of generator with conductor, F, extending along said circuit and with ground connections, of insulated rails $R^5$, $R^7$, of preceding section of track, B, insulated wheels G, G', and controlling magnet-coils on the rolling equipment connected with said wheels and having connections taken between the latter-named coils with locomotive L and conductor F and ground connections, E' of preceding section of track B, substantially as shown and described.

Signed at New York city, in the county of New York and State of New York, this 22d day of September, A. D. 1903.

HENRY W. SPANG.

Witnesses:
    DAVID M. EDSALL,
    ETHEL L. LAWLER.